Aug. 14, 1956　　　L. D. SWEARINGEN　　　2,758,844
WHEELED ROCKING HORSE
Filed Feb. 4, 1954　　　2 Sheets-Sheet 1
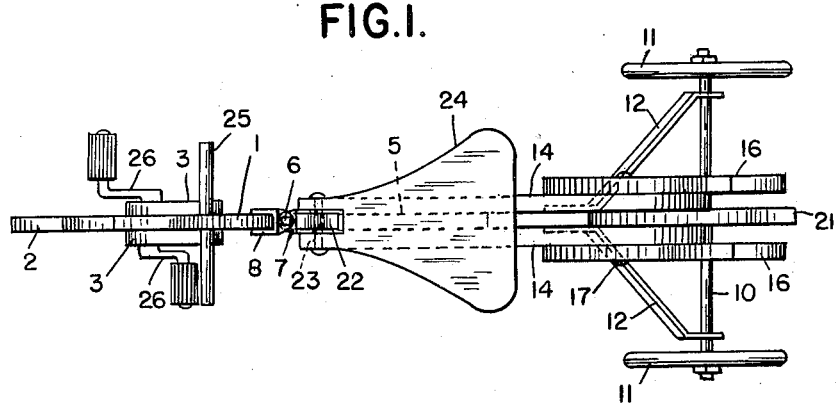
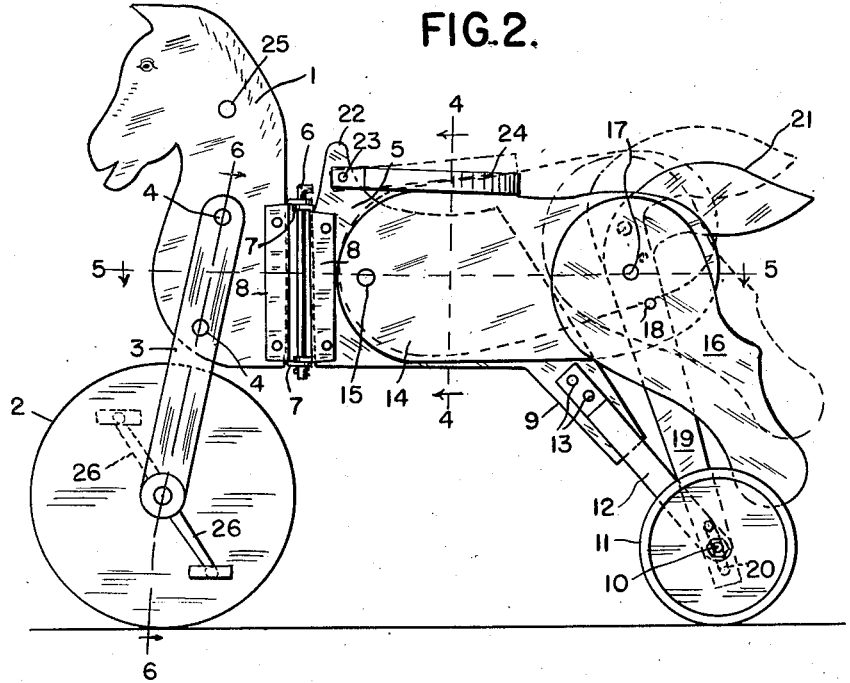
INVENTOR.
LEMUEL D. SWEARINGEN
BY
ATTORNEY Aug. 14, 1956 L. D. SWEARINGEN 2,758,844
WHEELED ROCKING HORSE
Filed Feb. 4, 1954 2 Sheets-Sheet 2

*INVENTOR.*
LEMUEL D. SWEARINGEN
*BY*
J.S. Murray
ATTORNEY

United States Patent Office 2,758,844
Patented Aug. 14, 1956

2,758,844

WHEELED ROCKING HORSE

Lemuel D. Swearingen, Detroit, Mich.

Application February 4, 1954, Serial No. 408,229

5 Claims. (Cl. 280—1.192)

This invention relates to vehicular toys and particularly wheeled rocking horses of a type adapted for pedal propulsion and deriving a rocking motion from forward travel.

An object of the invention is to equip a rocking horse with a front wheel and paired coaxial rear wheels, to mount on such wheels a structure simulating a horse and comprising a front plate and a pair of spaced parallel rear plates, to dispose a supporting plate between said rear plates and swivelly interconnect the front and supporting plates for steering purposes, to interconnect the front wheel and front plate for steering actuation in unison, and to impart an up and down rocking movement to the rear plates from the rear wheels, the rear plates being pivoted for such movement on the supporting plate and the latter having its rear end mounted on the rear wheels and functioning to guide the rear plates in their rocking travel.

Another object is to pivotally mount a saddle-simulating rider's seat on the front upper portion of said supporting plate, such seat extending rearwardly above and being freely carried by the paired rear plates and thus participating in the rocking travel of the rear plates.

These and various other objects are attained by the construction hereinafter described and illustrated in the accompanying drawings, wherein:

Fig. 1 is a top plan view of the improved toy.

Fig. 2 is a side elevational view of the toy.

Figure 3:
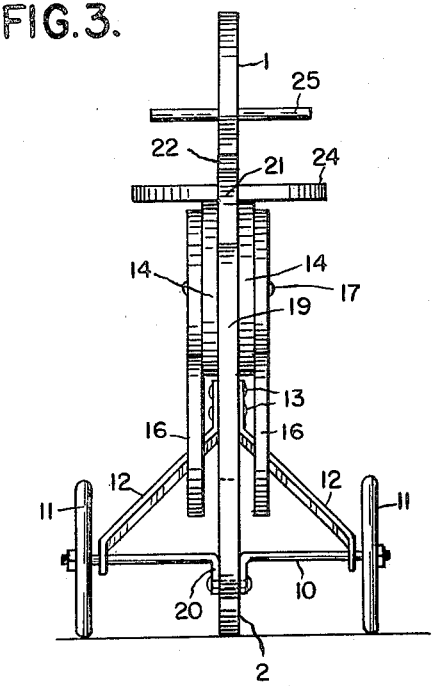
Fig. 3 shows the toy in rear elevation.
Figure 6:
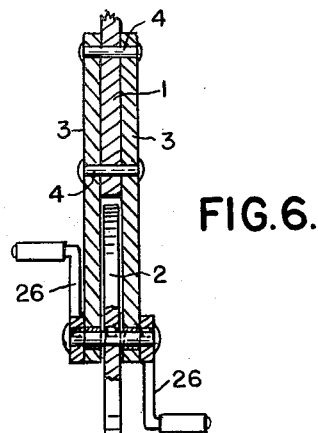
Fig. 6 is an approximately vertical sectional view, taken one the line 6—6 of Fig. 2.
Figure 5:
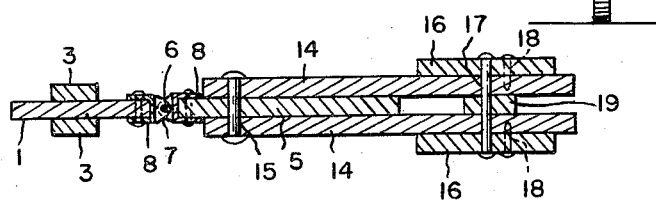
Fig. 5 is a horizontal sectional view taken on the line 5—5 of Fig. 2.
Figure 4:
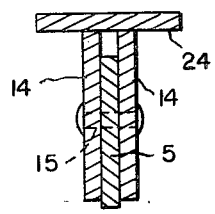
Fig. 4 is a vertical sectional view taken on the line 4—4 of Fig. 2.

In these views, the reference character 1 designates a front plate, simulating the head and neck portion of a horse. Beneath and parallel to said plate is located a front wheel 2, journaled upon and between a pair of bars 3 downwardly projecting from the plate 1 and oppositely secured to such plate by fastenings 4. Rearwardly extending from the lower portion of the plate 1 is a supporting plate 5, the plates 1 and 5 being swivelly interconnected for steering purposes by a substantially vertical pin 6. Such pin engages lapped lugs 7 integrally projecting from sheet metal fittings 8 which straddle mutually confronting upright edges of the joined plates. The rear portion of the plate 5 forms an arm 9 projecting downwardly and rearwardly toward an axle 10 on which paired rear wheels 11 are fixed, the axle being journaled in a pair of bars 12 extending convergently to said arm and rigidly secured to the latter by fastenings 13. A pair of duplicate horizontally elongated plates 14, roughly simulating the body of a horse, are disposed parallel and oppositely adjacent to the plate 5 and have their forward portions copivotally mounted at 15 on the forward portion of said plate. Said paired plates extend rearwardly beyond the plate 5 and are straddled by the upper portions of paired plates 16 simulating the rear legs of the horse. The leg members 16 are preferably spaced above the axle 10 and are rigidly secured to the body plates 14 by fastenings 17 and 18. The fastening 17 pivotally mounts the upper end of a pitman 19 having its lower end operatively engaging a U-formed crank 20 centrally formed by the axle 10. Integrally joined to the upper end of the pitman is a rearwardly projecting tail-simulating element 21. The forward end of the plate 5 has an upwardly extending lug 22 whereon is pivoted at 23 the reduced forward of an approximately horizontal and substantially triangular saddle plate 24. Such plate seats freely on the top edges of the body-forming plates 14. The lug 22 projects sufficiently above the saddle plate to simulate the pommel of a saddle.

A pair of handle rods 25 fixed on and oppositely projecting from the upper portion of the plate 1 may be gripped by a child using the described toy and apply a steering control. To propel the toy, the front wheel is equipped with oppositely projecting pedal-mounting cranks 26.

As the described toy is advanced by actuation of the pedal cranks, the pitman 19 pivotally raises and lowers the body plates 14. The saddle plate and occupant of the vehicle are likewise raised and lowered, adding to the simulation of horseback riding. In thus actuating the saddle plate, a desirable leverage is obtained by the considerable excess in length of the plates 14 as compared to the saddle plate. By locating the plate 5 between and in engagement with considerable areas of the plates 14, the latter are well guided in their up and down travel and are largely safeguarded against lateral forces which otherwise might impose excessive strains on the pivot 15. By extending the paired plates 14 rearwardly beyond the plate 5, there is formed a chamber between the rear portions of the paired plates to accommodate the pitman. By forming the tail element 21 as an extension from the upper end of the pitman, such element receives an up and down motion differing somewhat from movements of the body and saddle plates and contributing to simulation of a horse.

What I claim is:

1. A rocking horse comprising a front plate simulating the head and neck of a horse, a front wheel underlying said plate, a mounting rigidly engaging and downwardly projecting from said plate, means journaling the wheel on said mounting, a supporting plate rearwardly extending from the lower portion of the front plate, means establishing a substantially vertical swivel steering connection between the front plate and front edge of the supporting plate, a pair of spaced rear wheels, and axle rigidly interconnecting said wheels, a mounting for the supporting plate downwardly extending from such plate and carried by and journaling the axle, a pair of parallel plates simulating the body of a horse and engaging opposite sides of said supporting plate, means coaxially pivoting the forward ends of the paired plates on the forward portion of the supporting plate, a pitman having an upper portion engaged between said paired plates rearwardly of the supporting plate, means pivotally interconnecting the pitman and paired plates, and means on the axle engaging the lower portion of the pitman for actuating the pitman up and down, the supporting plate guiding the paired plates in travel on said pivoting means.

2. A rocking horse as set forth in claim 1, said means downwardly projecting from the front plate being a pair of bars disposed at opposite sides of the front plate and front wheel.

3. A rocking horse comprising a front plate simulating the head and neck of a horse, a front wheel underlying said plate, a mounting secured to and downwardly projecting from said plate, means journaling the wheel on said mounting, a supporting member rearwardly extending from the lower portion of said plate, means establishing a substantially vertical swivel steering connection between said plate and supporting member, a pair of spaced rear wheels, an axle rigidly interconnecting said wheels, a mounting for the supporting member downwardly extending from such member and carried by and journaling the axle, a plate simulating the body of a horse and having its forward portion disposed in lateral proximity to the supporting member, means pivoting the forward end of the body-simulating plate on the forward portion of the supporting member about an axis transverse to such plate, a pitman having an upper portion pivoted to the rear portion of the body-simulating plate, means on the axle engaging the lower portion of the pitman for actuating the pitman up and down, and a saddle member pivoted on and rearwardly extending from the front portion of the supporting member and seating freely on the body-simulating plate.

4. A rocking horse comprising a front plate simulating the head and neck of a horse, a front wheel underlying said plate, a mounting rigidly engaging and downwardly projecting from said plate, means journaling the wheel on said mounting, a supporting member rearwardly extending from the lower portion of said plate, means establishing a substantially vertical swivel steering connection between said plate and supporting member, a pair of spaced rear wheels, an axle rigidly interconnecting said wheels, a mounting for the supporting member downwardly extending from such member and carried by and journaling the axle, a pair of plates simulating the body of a horse and engaging opposite sides of said supporting plate, means coaxially pivoting the forward ends of the paired plates on the forward portion of the supporting member, a pitman having an upper portion engaged between said paired plates rearwardly of the supporting member, means pivotally interconnecting the pitman and paired plates, means on the axle engaging the lower portion of the pitman for actuating the pitman up and down, said supporting member having an upward projection on its forward portion, and a saddle member pivoted on and rearwardly extending from the upward projection and seated on said paired plates.

5. A rocking horse comprising a front plate simulating the head and neck of a horse, a front wheel underlying said plate, a mounting rigidly engaging and downwardly projecting from said plate, means journaling the wheel on said mounting, a supporting member rearwardly extending from the lower portion of said plate, means establishing a substantially vertical swivel steering connection between said plate and supporting member, a pair of spaced rear wheels, an axle rigidly interconnecting said wheels, a mounting for the supporting member downwardly extending from such member and carried by and journaling the axle, a pair of plates simulating the body of a horse and disposed at opposite sides of said supporting member, means coaxially pivoting the forward ends of the paired plates on the forward portion of the supporting member, a pitman having an upper portion engaged between said paired plates rearwardly of the supporting member, means pivotally interconnecting the pitman and paired plates, and means on the axle engaging the lower portion of the pitman for actuating the pitman up and down, said pitman having a rearward extension from its upper end fashioned to simulate a tail.

References Cited in the file of this patent

UNITED STATES PATENTS

| | | |
|---|---|---|
| 1,533,520 | Selenkow | Apr. 14, 1925 |
| 1,808,887 | Dunkley | June 29, 1931 |
| 2,021,531 | Urytzky | Nov. 19, 1935 |
| 2,626,161 | Thacker | Jan. 20, 1953 |